United States Patent [19]

McDermott

[11] Patent Number: 4,691,157
[45] Date of Patent: Sep. 1, 1987

[54] BATTERY CHARGING APPARATUS

[76] Inventor: Julian A. McDermott, 1639 Stephen St., New York, N.Y. 11227

[21] Appl. No.: 672,624

[22] Filed: Nov. 19, 1984

[51] Int. Cl.⁴ .............................................. H02J 7/00
[52] U.S. Cl. ......................................... 320/2; 320/7; 320/16; 362/183
[58] Field of Search ....................... 320/2-5, 320/6, 7, 15, 16; 307/150

[56] References Cited

U.S. PATENT DOCUMENTS

| | | | |
|---|---|---|---|
| 3,749,905 | 7/1973 | Friedman et al. | 320/3 X |
| 4,004,208 | 1/1977 | Tamminen | 320/2 |
| 4,139,812 | 2/1979 | Huggins | 320/7 |
| 4,297,629 | 10/1981 | Godard et al. | 320/7 |
| 4,540,929 | 9/1985 | Binkley | 320/2 |

Primary Examiner—R. J. Hickey
Attorney, Agent, or Firm—Kenyon & Kenyon

[57] ABSTRACT

A charging rack for charging an auxiliary battery from the electrical system of an internal combustion engine is disclosed. The rack is connected to the electrical systems of the internal combustion engine and a module which houses the battery to be charged. The charging rack is intended for use with a vehicle internal combustion engine which includes a battery and an ignition switch. The charging circuit includes a diode and a switch connected across the diode which in operation enable the battery to be charged to its full nominal voltage which may be equal to the nominal voltage while preventing discharge of the battery to be charged into the electrical system of the internal combustion engine, particularly when the engine is being started. Use of the system is applied to portable hand lights is also described.

11 Claims, 6 Drawing Figures

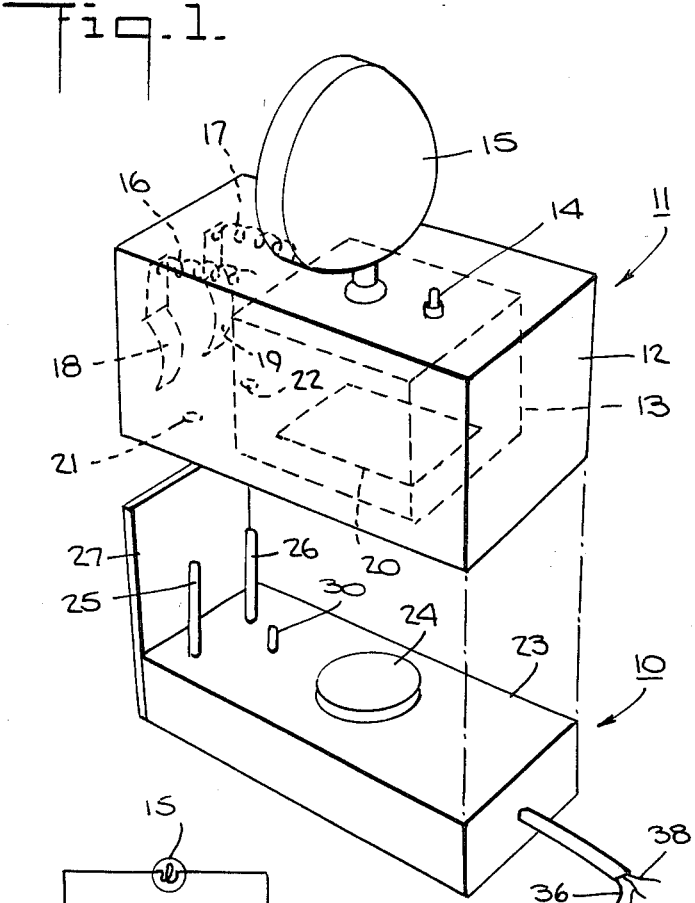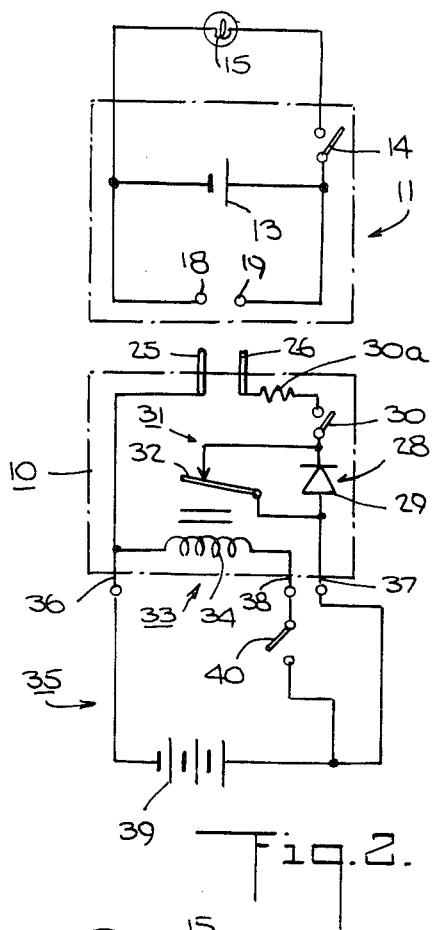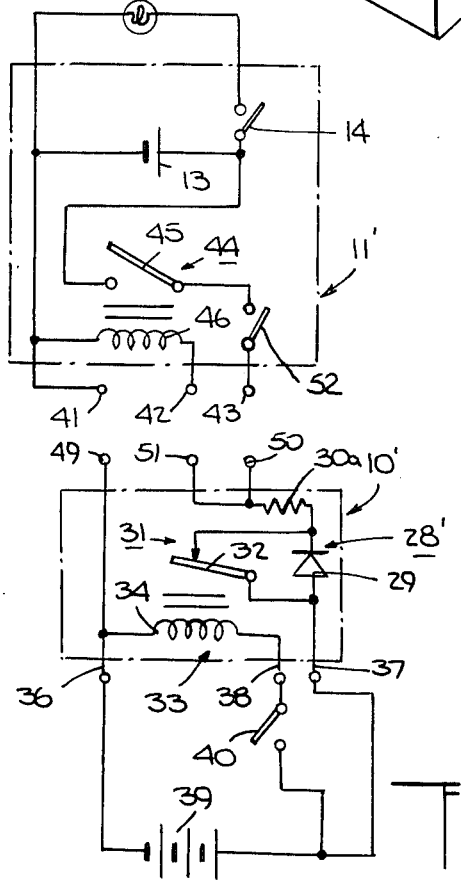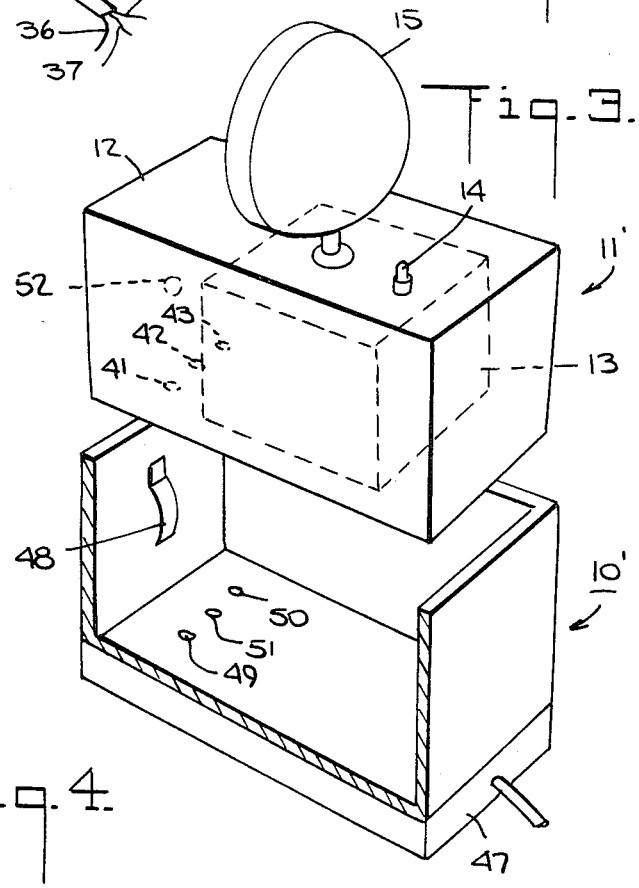
Fig. 1.
Fig. 2.
Fig. 3.
Fig. 4.

BATTERY CHARGING APPARATUS

This invention relates to a battery charging apparatus. More particularly, this invention relates to an apparatus for charging batteries from the electrical system for an internal combustion engine, and still more particularly to the charging of batteries in battery operated devices.

BACKGROUND OF THE INVENTION

Many portable battery-operated devices include a rechargeable battery which operates at a voltage which is the same as that of the electrical system of many internal combustion engines. For example, many battery-operated devices include a rechargeable battery having a 12 volt rating, the same as that of the battery of most automotive vehicles. When charging such a battery from an automotive vehicle, it is generally not connected directly to the vehicle's electrical system in order to avoid possible damage to the device battery. Direct connection of the device battery to the vehicle's electrical system presents no serious damage problem to the device battery when the vehicle engine is running since charging of both the vehicle battery and the device battery is controlled by the vehicle voltage regulator. Typically, the charging voltage is kept above the voltage rating of the vehicle battery (and the device battery) and yet below a voltage which could damage the vehicle battery (and the device battery). When the vehicle engine is shut off, there is little danger of damaging the device battery, and if the vehicle battery is in reasonably good condition, the device battery can be fully or substantially fully charged.

With the device battery connected directly to the vehicle electrical system, it is possible, and also likely, however, to damage the device battery during starting of the vehicle engine. Since the voltage of the vehicle electrical system drops considerably during starting, and quite often to a value which is less than the voltage level of the device battery, in such a case, the device battery supplies current to help start the vehicle engine. With its relatively low capacity, it is likely in that siutation that the device battery will be damaged, particularly where there is a large voltage difference between the voltage level of the device battery and that of the vehicle's electrical system during starting.

The aforementioned problem can be corrected by putting a rectifier diode in series with the vehicle battery and the device battery. The series diode prevents discharging of the device battery to the vehicle battery when the vehicle battery voltage is less that that of the device battery, which occurs during starting of the vehicle engine. When the vehicle engine is running and the vehicle battery charging system is operating, the voltage at the vehicle generator typically exceeds the voltage of the device battery plus the voltage drop in the diode. The diode being forward-biased allows charging of the device battery. However, when the vehicle engine is not running, charging of the device may not continue from the vehicle battery because of the voltage drop in the diode. Hence, if the device battery does not reach its full potential with the engine running, the device battery will not reach the full voltage of the vehicle battery or its own full power with the engine off. Thus, while it is possible to charge the device battery from the electrical system of an automotive vehicle having the same voltage rating as the device battery, in many instances it is not possible to fully charge the device battery and at the same time safeguard the device battery from damage during starting.

SUMMARY OF THE INVENTION

Accordingly, it is an object of the present invention to provide an apparatus for charging an auxiliary battery from the electrical system for an internal combustion engine, particularly an automotive vehicle electrical system, such that the voltage of the battery to be charged and the vehicle battery will reach the same value.

A further object of the present invention is to provide an apparatus for fully charging a battery from the electrical system for an internal combustion engine while preventing damage to the battery to be charged, particularly a battery which has the same voltage rating as that of the electrical system.

Another object of the present invention is to provide a rack for releasably holding a battery under charge.

Another object of the present invention is to provide apparatus for charging and holding a battery in which the battery electrodes are isolated from the exterior of the apparatus when the battery is not being charged.

Another object of this invention is to provide means of charging a nominal 6 volt battery from a 12 volt vehicular system directly without the large power loss normally ocurring.

Briefly, the invention provides an apparatus which enables an auxiliary battery to be fully charged from the electrical system for an internal combustion vehicular engine even where the nominal operating voltage and rating of the auxiliary battery and the electrical system are substantially the same. The apparatus can be connected so as to prevent a possibly damaging drain on the auxiliary battery during starting or discharge of the auxiliary battery when the vehicle is running but using power at a rate above the vehicle's generating rate.

The apparatus comprises a charging circuit having first means to allow current flow in one direction from the vehicle battery while blocking a reverse current flow, and second means for short circuiting the first means to permit a current flow around the first means. The second means has a first state to complete a short circuit about the first means and a second state to interrupt the short circuit. In addition, the apparatus includes an actuating means for actuating the second means to change the second means from the first state to the second state.

The means within the charging circuit to allow the current flow in one direction but to block a reverse current flow may be in the form of a diode.

The short circuiting means may include a switch having a normally closed position in the first state of the short circuiting means and an open position in the second state. In this case, the actuating means includes a relay coil for moving the switch from the closed position to the open position.

The apparatus may be incorporated in a charging rack which is constructed to receive a battery operated module directly thereon or may be constructed in the manner of a box-like receptacle for receiving the module therein. In the first case, the charging rack can be provided with a pair of upstanding prongs which may pass into the interior of the battery-operated module so as to actuate a pair of contacts therein to connect the battery of the module to a battery of the electrical system.

The battery may also be disposed in a device in which the device battery is completely isolated from the exterior of the device when the battery is not being charged, but yet the device connects the battery to the rack when the device is received in the rack. This device can be completely sealed and water-tight. In this case, contacts are disposed on the exterior of the device and are selectively connected to the device battery to enable the device battery to be charged when the device is placed in the rack. When the battery is not being charged, the contacts are disconnected from the battery.

According to one embodiment, a mechanically operated switch isolates and connects the device battery, and according to another embodiment, an electrical circuit, e.g., a relay or semiconductor switch, isolates and connects the device battery. In another embodiment, the apparatus includes a rack which receives the battery to be charged, a disconnect switch disposed in the rack connected between a terminal to which the battery to be charged is connectable and the electrical system, and means for opening the disconnect switch when the battery to be charged is not in the rack and for closing the disconnect switch when the battery to be charged is in the rack. The opening/closing means for the disconnect switch includes a mechanical actuator which is movable into a first position to open the disconnect switch when the battery to be charged is not in the rack and movable into a second position to close the disconnect switch when the battery to be charged is received in the rack.

The apparatus may include a magnet affixed to the rack and positioned to attract and secure to the rack a device in which the battery to be charged is disposed and which includes magnetic material.

In practice, many hand-held lights and similar devices are operated at six volts. Recharging such a device from a twelve volt vehicle battery presents a special problem in that efficiency is low due to the need to drop the voltage. Also, a special voltage control must be included to prevent overcharge. However, there problems can be overcome by using a pair of six volts batteries. To this end, when the light is to be used, the six volt batteries would be connected in parallel to provide six volts. However, on charging, an automatic switch which is made part of the battery module would connect the batteries in series so that charging can take place off a twelve volt vehicle system.

BRIEF DESCRIPTION OF THE DRAWINGS

The present invention is illustrated by way of example and not limitation in the figures of the accompanying drawings in which like numerals indicate similar parts and in which:

FIG. 1 is an exploded perspective view of an apparatus according to the invention for charging a battery of a light module;

FIG. 2 is a schematic circuit diagram of the module and charging rack of FIG. 1 according to one embodiment of the invention;

FIG. 3 is an exploded perspective view of a modified arrangement of a battery and light module and a charging rack, partially in section, according to another embodiment of the invention;

FIG. 4 is a schematic circuit diagram of the module and charging rack of FIG. 3;

DESCRIPTION OF THE PREFERRED EMBODIMENTS

Figure 5:
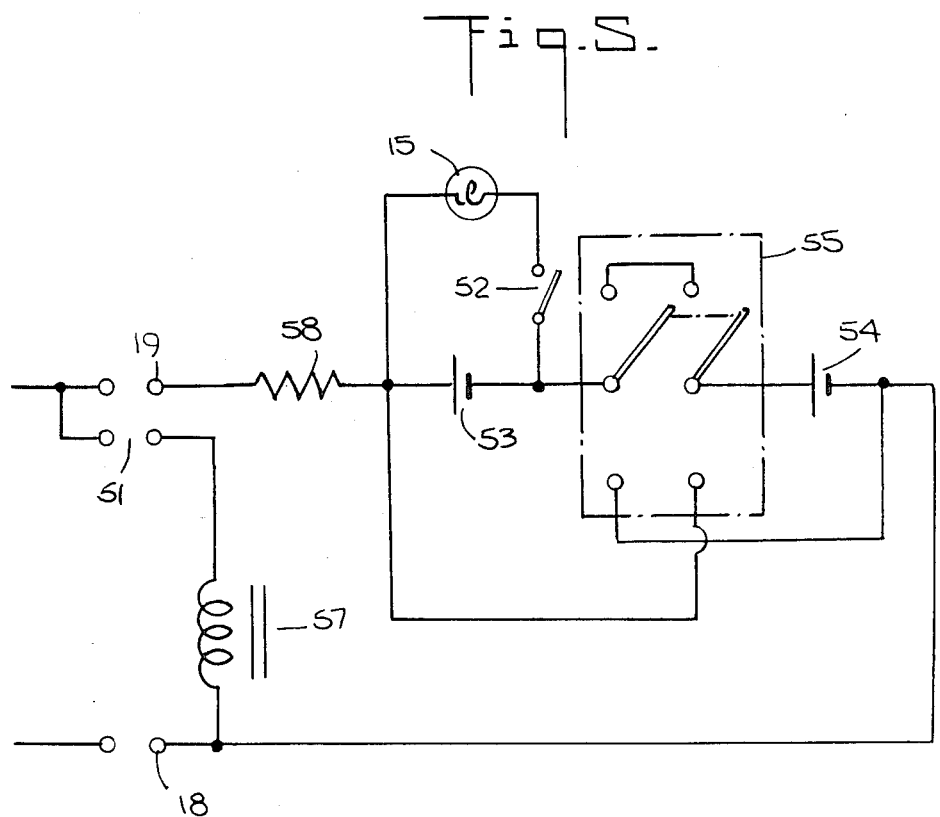
FIG. 5 is a schematic circuit diagram of an embodiment for recharging of a six-volt battery.

While the preferred embodiment of the invention is described with respect to a portable, battery-operated light module, the invention is applicable to other battery-operated devices and to charging batteries per se. Moreover, systems other than vehicle electrical systems can be used to charge such devices and batteries.

Referring to FIG. 1, the battery charging apparatus 10 is in the form of a rack to receive a battery-operated light module 11.

As illustrated, the light module 11 has a housing 12 which is of box-like shape in which a rechargeable battery 13 is disposed. The battery 13 is connected through an on/off switch 14 to a lamp 15 in generally known manner. In addition, a pair of wires 16, 17 are connected to terminals (not shown) of the battery 13 and to two contacts 18, 19, such as flexible leaf-type spring contracts mounted on the housing 12.

The housing 12 can be made of plastic or ferrous metal. When made of plastic, a ferrous metal plate 20 is provided on the bottom of the housing 12 for reasons described below. In addition, a pair of apertures 21, 22 are provided in the bottom of the housing 12 adjacent to and aligned with the contacts 18, 19.

The rack 10 has a housing 23 on which a permanent magnet 24 is mounted to magnetically attract and hold the light module 11 when mounted thereon. In addition, the rack 10 has a pair of prongs 25, 26 which extend upwardly so as to be received within the apertures 21, 22 of the module 11. The prongs 25, 26 are of a length so as to make contact with the spring contacts 18, 19 within the housing 12 of the module 11. The rack 10 also has a back plate 27 which slidably contacts one side of the module housing 12 for positioning purposes.

Referring to FIG. 2, the rack 10 shown with one side removed includes a charging circuit 28 which has a means, such as a diode 29, to allow current flow in one direction while blocking a reverse current flow. In addition, the charging circuit 28 includes a switch 30 of push-button type which is located between one prong 26 and the diode 29 in order to selectively open and close the charging circuit. As indicated in FIG. 1, the push-button switch 30 extends from the housing 23 of the rack 10 so as to be actuated by the module 11 when the module 11 is placed on the rack 10.

The rack 10 also includes a means 31 for short-circuiting the diode 29 in order to permit a current flow around the diode 29. As indicated, this means 31 includes a switch 32 which has a normally closed position corresponding to a first state of the short circuiting means 31 in order to complete a short circuit about the diode 29, as well as an open position corresponding to a seocnd state of the means 31 in order to interrupt the short circuit. In addition, an actuating means 33 is provided for actuating the short circuiting means 31 in order to change the short circuiting means 31 from the first state to the second state. As illustrated, this actuating means 33 is in the form of a relay coil 34 for moving the switch 32 from the closed position, as shown, to the open position thereof.

As indicated in FIG. 2, the charging rack 10 is connected to a vehicle electrical system 35 by wires 36, 37, 38 which may be brought out of the housing 23 at any convenient location. If desired, the wires 36, 37, 38 can be formed by a multi-wire cable or a wire assembly (see FIG. 1). As shown, two of the wires 36, 37 are connected across a vehicle battery 39 while the third wire 38 is connected to a terminal of an ignition or starter switch 40 (hereinafter referred to as an operation switch). The other terminal of the switch 40 is connected to the vehicle battery 39.

As indicated in FIG. 2, one prong 25 of the charging rack 10 is connected directly to one terminal of the vehicle battery 39 via the wire 36 while the other prong 26 is connected to the other terminal of the vehicle battery 39 via a current-limiting impedance means 30a such as a resistor 30a, the switch 30, diode 29 and wire 37.

The diode 29 may be any commonly available rectifier diode which is rated for the voltage and current charging values likely to be encountered in the vehicle electrical system. The diode 29 is electrically connected so as to allow current flow from the vehicle electrical system 35 to the battery 13 in the module 11 and to block a reverse current flow to the vehicle electrical system from the battery 13. Accordingly the anode of the diode 29 is connected to the vehicle electrical system and the cathode to the battery 13 via switch 30 and prong 26.

The relay coil 34 is connected in series with the ignition switch 40 and the negative terminal of the vehicle battery 39. The relay switch 32 is normally closed and shorts the diode 29 when the relay coil 34 is not energized, i.e. when the ignition switch 40 is not closed, i.e. not activated. In operation, referring to FIGS. 1 and 2, the battery and light module 11 are mounted on the charging rack 10 with the prongs 25, 26 contacting the spring contacts 18, 19 and the module 11 drawn and held to the charging rack 10 by the magnet 20. At time other than when the operation switch 40 is closed, the relay coil 34 is not energized and the diode 29 is thereby shorted. As a result, the vehicle battery 39 is connected directly across the battery 13 to be charged via the switch 30, prongs 35, 26 and contacts 18, 19, and there is essentially no voltage drop between the vehicle battery 39 and the battery 13 to be charged. Accordingly, it is possible for the battery 13 to be fully charged even when the voltages of the vehicle battery and the battery to be charged are the same. This is particularly pertinent when the battery to be charged has only a fraction of the capacity of the vehicle battery. However, when the ignition switch 40 is activated, coil 34 is energized to open the switch 32 and thereby electrically place diode 29 between the vehicle battery 39 and the battery 13 to be charged. As a result, when the voltage of the vehicle battery 39 drops during starting of the vehicle engine, the diode 29 will block any possible current flow from the battery 13 to be chraged into the vehicle electrical system and thereby prevent any possible damage to the battery 13.

Of note, if the connection is made to the starter switch circuit, the relay shorting the diode is open only during the starting time, and current cannot flow out of the auxiliary battery during this time but can flow when the engine is running or is off and current demand requires it. If the connection is made to the ignition switch circuit, current can flow out of the auxiliary battery only when the ignition is off.

If the diode is eliminated, the circuit shown in FIG. 2 can be used but the contact 38 operating the relay would have to be connected not to the ignition switch but to the vehicle starter switch circuit and protection against excessive current drain on the auxiliary battery would exist only when the starter is in use.

Although the diode 29 is shown connected between the positive terminal of the vehicle battery 39 and the positive terminal of the battery to be charged, the diode 29 and the relay contacts could be placed between the negative terminal of the vehicle battery 39 and the negative terminal of the battery 13 to be charged, in which case the polarity of the didoe will be opposite to that shown in FIG. 2.

Charging of the auxiliary battery can be accomplished without the use of the relay 34 and the corresponding connections. However, the auxiliary battery could never normally reach the same charging voltage as the vehicle battery due to the inherent voltage drop in the diode. The difference in voltage would represent a major reduction in battery charged energy. The charging system can also be used without the diode and the relay as shown in FIG. 2 using the impedance 30a only for protection. With this arrangerent, if the impedance is small, there would be a large discharge of the battery on starting and, if the impedance value is large, charging current would be small.

The switch 30 disconnects the prong 26 from the positive terminal of the battery 39 when the module 11 is not on the rack 10 so that the prongs 25, 26 are not live when exposed. The switch 30 is mechanically operated and can be any suitable push-button switch, microswitch, lever-activated switch, or the like.

Referring to FIG. 3, wherein like characters indicate like parts as above, a battery operated light module 11' may be constructed so as to fit within a charging rack 10' in the form of a box-like receptacle. As indicated, the module 11' includes a light 15, a battery 13 and a switch 14 connected between the battery terminals (not shown) and the light 15. The module 11' includes three metallic contacts 41, 42, 43 mounted on the bottom of the housing 12. The contacts 41, 42, 43 pass through the housing 12 and the contacts are connected as shown in FIG. 4.

In addition, the module 11' includes switch means 44 between the module contacts 41-43 and the battery 13 having a normally open state to disconnect the contacts 41-43 from the battery 13. As indicated in FIG. 4, the switch means 44 includes a relay switch 45 connected between the positive terminal of the battery 13 and one contact 43 and a relay coil 46 connected between the remaining contacts 41, 42. The negative terminal of the battery 13 is connected to contact 41.

The charging rack 10' is sized to permit the module 11' to be inserted into and received by the charging rack 10' with the charging circuitry 28' disposed in a lower compartment 47. In addition, a leaf spring 48 is provided on one side of the rack 10' to be compressed when the module 10' is inserted to help retain the module 10' in the rack 11'.

The charging circuit 28 includes three contacts 49, 50, 51 instead of prongs 25, 26 of the charging circuit of FIG. 2, and is conhected to the vehicle electrical system in the same manner as described for the charging circuit of Fig. 2. The contacts 49–51 are positioned to cooperate with the module contacts 41–43. Also, the contacts 50, 51 are connected together so that when the battery module 11 is inserted in the rack 10, both the realy coil 34 and the charging circuit 28' are energized with the resulting response of the closing of the contacts 42, 43. The charging circuit 28' may also include a switch 30

(not shown in FIG. 4) disposed as shown in FIG. 2, although the need for such a switch is minimized because the contacts 49, 50, 51 are disposed within the rack enclosure.

The charging circuit 28' operates similarly as the charging circuit 28 of FIG. 2, and the relay switch 45 is normally closed so that the positive terminal of the vehicle battery 39 is connected to contacts 50, 51. Relay coil 46 is thereby connected across the battery 39 via contacts 42, 43 switch 32 and contacts 49, 41, and is energized to thereby close switch 45. As a result, the positive terminal of the battery is connected to contact 43 and thereby directed to the vehicle battery 39. This allows the battery 13 to be charged.

When the module 11' is removed from the charging rack 10', relay coil 46 is de-energized. This causes the switch 45 to open and thereby isolate contact 43 from the positive terminal of the battery 13. Thus, there is no danger that the exposed contact 43 could cause the battery 13 to be discharged or could present an electrical shock hazard. The relay coil 46 is also de-energized when the module 11' is inserted into the charging rack 10' and the vehicle operation 40 is activated. This results from opening of relay switch 32 which inserts diode 29 into the circuit, the diode becoming back-biased to thereby prevent the flow of current through relay coil 46.

As an alternative to the relay switch 45, a mechanically-operated switch 52 (FIGS. 3 and 4) can be connected between the positive terminal of the battery 13 and the contact 43. This switch 52 can be any suitable push-button switch, microswitch, lever-activated switch, or the like. When the switch 52 is utilized, the spring 48 acts as a cam to actuate the switch 52 and close the switch 52 when the module 11' is inserted in the rack 10'. The third contacts 42, 51 and the relay 44 are not required when a switch 52 is employed.

The charging racks 10, 10' depicted in FIGS. 1-4 are specifically intended to prevent discharge of the battery 13 during starting of the vehicle engine. However, any discharge of the battery 13 is prevented when the voltage on the battery 13 exceeds the voltage on the vehicle battery and an operation switch is "on".

The charging circuit may also be constructed so as to check the differential between the vehicle battery and the charged battery voltages. In this case, the circuit would include any suitable polarity-voltage sensing element or means.

Referring to FIG. 5, wherein like reference characters indicate like parts as above, a battery-operated module may also be constructed with a pair of six-volt batteries instead of with a twelve-volt battery. For example, as illustrated, a batter-operated light module 11" is constructed with a pair of six-volt batteries 53, 54 with the light 15 being a six-volt lamp. In addition, a double pole double throw push button switch 55 is provided. This switch 55 is operated by a prong (not shown) on the charging rack (not shown) or by any nechanical means responsive to the insertion of the battery module in the rack.

When the module 11' is placed in a rack (not shown) the pressure of the prong of the rack would operate the switch 55 so that the batteries, 53, 54 would be connected in series at twelve volts. Otherwise, the batteries, 53, 54 would be in parallel and have a six volt output.

Charging of the batteries 53, 54 of the module 11" would be similar to that as described above with respect to FIG. 2.

Figure 6:
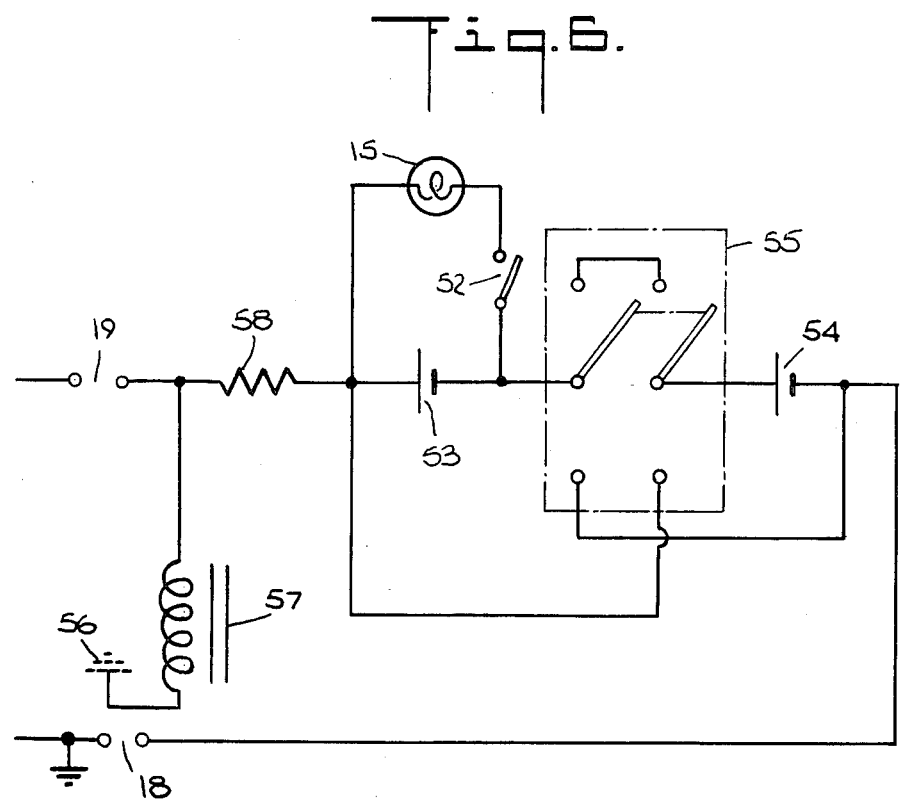
FIG. 6 is a schematic circuit diagram of a modified arrangement for activating the circuit for recharging a six-volt battery.

The double throw switch 55 can be electrically operated as a relay to eliminate mechanical switch operation. In this respect, the relay coil 57 could be activated from a third set of contacts in the same manner as shown in FIG. 3. One side of the relay would be connected to contact set 51 and the other side would be connected to contact terminal 18. Alternatively, the relay could be actuated by inserting the battery module in the rack which would then ground the batteries to a ground 56 (see FIG. 6). The other side of the relay would then be connected to terminal 19.

Of note, the circuit may also employ a current limiting resistor 58. Solid state switching could be used instead of the relay and zener. Such switching would be accomplished by the use of a voltage comparitor actuated when the higher voltage is applied to charge the batteries. The comparitor could actuate elements to change the battery connections from parallel to series.

This invention thus provides an apparatus for holding a portable battery-operated device and charging the device battery to full capacity and voltage from a vehicle battery having the same voltage as the battery being charged without danger of damaging the battery being charged.

Although the apparatus is described for a charging system where the device and vehicle batteries have the same rating, the apparatus is applicable to a system where the voltage of the battery to be charged is less than that of the electrical system. In such an embodiment, voltage dropping impedance, diodes and resistors can be introduced in the circuit of the battery to be charged.

What is claimed is:

1. In combination
a portable module having a light mounted thereon, at least one rechargeable battery therein for operating said light, and a pair of contacts connected to said battery;
an electrical system of an automotive vehicle having a second battery and an operation switch connected to said second battery, said switch having a normally open position;
an apparatus for charging said rechargable battery from said second battery, said apparatus having a charging circuit with a diode between said second battery and one of said contacts for said rechargeable battery, means for short circuiting said diode to permit a current flow around said diode, said means including a second switch having a normally closed position to complete a short circuit about said diode and an open position to interrupt said short circuit, and actuating means for actuating said second switch connected with said operation switch to move said seocnd switch to said open position in response to closing of said operation switch.

2. The combination as set forth in claim 1 wherein said actuating means includes a relay coil connected to said operation switch for moving said second switch to said open position thereof.

3. The combination as set forth in claim 1 wherein said apparatus includes a pair of contacts for completing a circuit with said contacts of said module.

4. The combination as set forth in claim 1 wherein said module has a housing having said contacts thereof disposed internally therein and said contacts of said apparatus are prongs passing into said module housing.

5. The combination as set forth in claim 1 wherein one of said contacts of said apparatus is connected with said diode and the other of said contacts of said apparatus is connected to one side of said second battery and wherein said diode is connected to an opposite side of said second battery.

6. The combination as set forth in claim 1 wherein said module includes switch means between said module contacts and said rechargeable battery having a normally open state to disconnect said module contacts.

7. The combination as set forth in claim 6 wherein said module includes a third contact and said switch means includes a realy coil connected to said pair of contacts and a relay switch connected between said rechargeable battery and said third contact and wherein said apparatus has a contact for contacting said third contact upon placement of said module on said apparatus to energize said relay coil to close said relay switch and to energize said rechargeable battery.

8. The combination as set forth in claim 6 wherein said apparatus includes a housing defining a box-like receptacle receiving said module and having a spring therein for actuating said switch means into a closed position.

9. The combination as set forth in claim 1 wherein said module includes a pair of rechargeable batteries connected in parallel to said light and switch means for connecting said rechargeable batteries in series.

10. The combination as set forth in claim 9 wherein one of said contacts of said apparatus actuates said switch means of said module in response to mounting of said module on said apparatus.

11. The combination as set forth in claim 10 wherein said switch means is a relay characterized in being activated by the application of a charging voltage equal to said pair of rechargeable batteries connected in series.

* * * * *

UNITED STATES PATENT AND TRADEMARK OFFICE
CERTIFICATE OF CORRECTION

PATENT NO. : 4,691,157

DATED : September 1, 1987

INVENTOR(S) : Julian A. McDermott

It is certified that error appears in the above-identified patent and that said Letters Patent is hereby corrected as shown below:

Column 5, line 41 "35" should be -25-
Column 6, line 10 "didoe" should be -diode-
Column 6, line 60 "conhected" should be -connected-
Column 7, line 10 "43 switch" should be -43, switch-
Column 7, line 53 "batter-" should be -battery- Column 8, line 55, "seocnd" should read -- second --.

Signed and Sealed this

Twenty-sixth Day of April, 1988

Attest:

DONALD J. QUIGG

*Attesting Officer*      *Commissioner of Patents and Trademarks*